US005538165A

United States Patent [19]
Frohn

[11] Patent Number: 5,538,165
[45] Date of Patent: Jul. 23, 1996

[54] CONTAINER FOR TRANSPORTING LIQUIDS

[76] Inventor: Walter Frohn, Geiselgasteigstr. 100, D-81545 München, Germany

[21] Appl. No.: 405,906

[22] Filed: Mar. 17, 1995

[30] Foreign Application Priority Data

Apr. 15, 1994 [DE] Germany .............................. 9406266 U

[51] Int. Cl.$^6$ ...................................................... B67D 3/00
[52] U.S. Cl. .......................................... 222/479; 222/482
[58] Field of Search ........................................ 222/478, 479, 222/481.5, 482

[56] References Cited

U.S. PATENT DOCUMENTS

| | | | |
|---|---|---|---|
| 2,291,230 | 7/1942 | Johnson | 222/479 X |
| 3,901,417 | 8/1975 | Schiemann | 222/479 |
| 4,838,464 | 6/1989 | Briggs | 222/478 |
| 5,346,106 | 9/1994 | Ring | 222/479 X |

FOREIGN PATENT DOCUMENTS

| | | | |
|---|---|---|---|
| 539220 | 7/1955 | Belgium | 222/479 |
| 0058624 | 8/1982 | European Pat. Off. | |
| 8203406 | 9/1982 | France | |
| 1604653 | 2/1971 | Germany | |
| 2004632 | 8/1971 | Germany | |
| 2153155 | 5/1973 | Germany | 222/478 |
| 8017829 | 11/1980 | Germany | |
| 3048670 | 9/1981 | Germany | |
| 854860 | 11/1960 | United Kingdom | |
| 2095637 | 10/1982 | United Kingdom | 222/478 |
| 2098572 | 11/1982 | United Kingdom | |

*Primary Examiner*—Andres Kashnikow
*Assistant Examiner*—Kenneth Bomberg
*Attorney, Agent, or Firm*—Robert W. Becker & Associates

[57] ABSTRACT

A container produced of plastic material by blow-molding in a blow-molding device has an upper wall and a bottom connected to one another by a sidewall. A filling/pouring spout is located at the sidewall. The filling/pouring spout has an outer thread and a continuous circular sealing surface. A venting channel for providing a uniform, continuous outflow of a liquid contained in the container is provided. The venting channel is separated by a stay from the upper wall of the container. The stay is produced by squeezing edges of the blow-molding device. The venting channel has an inlet located within the filling/pouring spout. The upper end of the inlet is positioned at a level of the uppermost, continuous thread winding of the outer thread. The venting channel extends substantially horizontally above the upper wall in the form of a closed conduit from the inlet toward a portion of the sidewall opposite the filling/pouring spout into a vacuum space of the container in which, upon pouring of the liquid, a vacuum is created when no pressure compensation is provided. The venting channel has an underside extending downwardly at an angle of 2° to 15° relative to the horizontal. The thread windings of the outer thread below the uppermost thread winding have discontinuities resulting from the squeezing edges of the blow-molding device for forming the stay. Portions of the thread windings extend across the backside of the inlet of the venting channel between the discontinuities.

6 Claims, 3 Drawing Sheets

FIG. 7
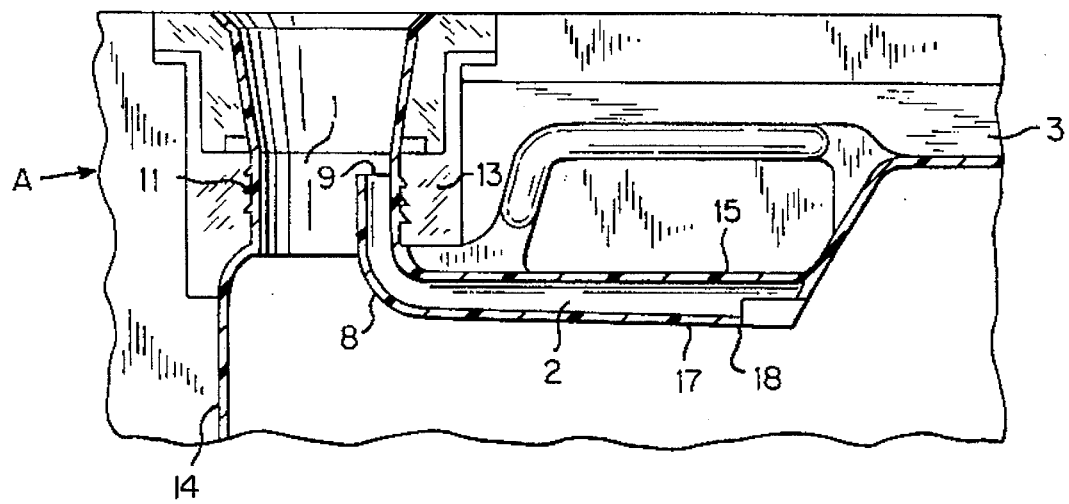
FIG. 8
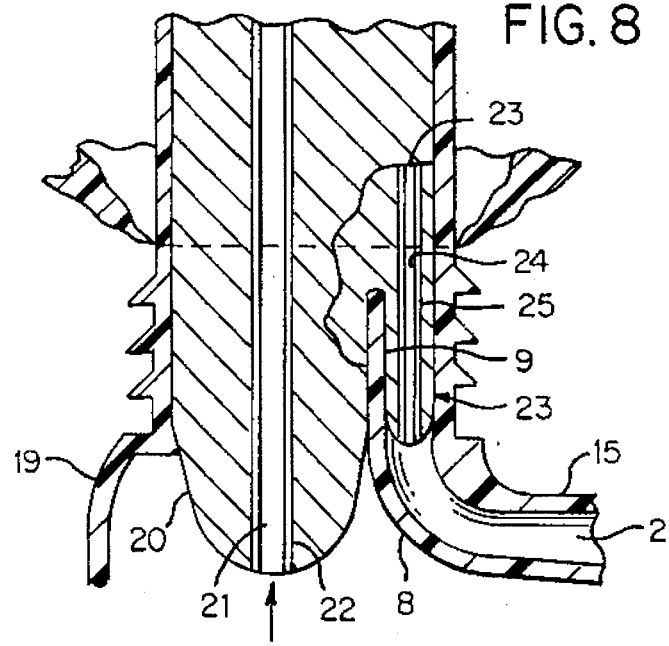
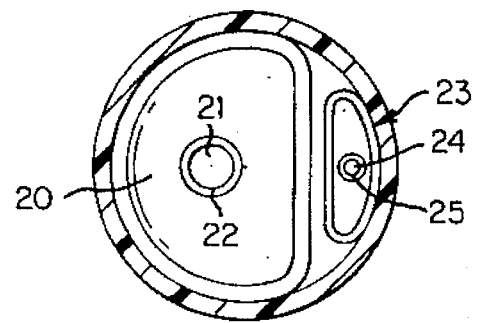
FIG. 9

CONTAINER FOR TRANSPORTING LIQUIDS

DESCRIPTION OF THE INVENTION

The present invention relates to a container for storing and transporting liquids, especially hazardous liquids, the container being produced by blow-molding from plastic material and having adjacent to one of the sidewalls a filling/pouring spout into which a venting channel, produced by squeezing edges of a blow-molding device, for achieving a uniform continuous flow of the contained liquid is provided.

Such containers are subject to very strict international safety regulations according to which they must withstand extreme temperatures, pressures and free fall loads, which regulations determine the selection of material and the container shape.

When pouring out the liquid contained therein, a vacuum is formed within the container at the shoulder opposite the filling/pouring spout which vacuum impairs free flowing of the liquid contained in the container and interrupts this flow until the vacuum reaches a value that is so great that air is sucked in through the filling/pouring socket. The subsequent release of the outflowing liquid, the so-called gurgling, causes splashing and spilling of the liquid contained in the container which is to be avoided under any circumstances for caustic liquids.

In European patent application 0 058 624 and United Kingdom patent application 2,501,632 a venting channel is suggested for compensating the resulting vacuum. This venting channel begins inside the filling/pouring spout below the level of the outer closure thread and is guided in a U-shaped curve into the hollow grip and through the grip into the vacuum space. The downwardly oriented U-shaped curvature fills with liquid during filling of the container, during transport, when liquid sloshes within the container, or when the container is placed upside down. The liquid is retained in the U-shaped portion due to the vacuum generated in the vacuum space when pouring out the liquid contained in the container. In both of the aforementioned published documents it has therefore been suggested to provide the U-shaped tubular member with a downwardly extending outlet opening. However, when emptying the container, the liquid contained in the container can also flow through this outlet opening and thereby obstruct the venting channel. Even though in certain situations a gurgling-free pouring of a liquid from such a container is possible with the aid of the suggested venting channels, the great dangers resulting from a single or multiple obstructions of the venting path by the liquid which causes unpredictable interruption of the flow, deflection of the flow, and splashing of the liquid, must be avoided under any circumstances.

From German Auslegungsschrift 1 604 653 a bottle with a lateral venting channel is suggested which is molded from the pre-formed container when the blow mold is closed. This channel ends at the lower portion of the bottle. However, this channel will fill up, according to the principle of communicating tubes, during filling of the container with liquid. The liquid in the venting tube upon emptying the container is again retained due to the resulting vacuum. Thus, this container exhibits the same disadvantages as the abovementioned containers.

U.S. Pat. No. 4,838,464 discloses a blow-molded plastic bottle in which the gurgling during pouring, especially when pouring dangerous liquids, is to be avoided. For this purpose, a venting channel is provided that extends to the upper edge of the filling/pouring spout (see FIGS. 14–16). This venting channel is connected to the top of the bottle by a stay that is formed by squeezing edges of the blow-molding tool. The resulting V-shaped depressions of the lip of the spout prevent a secure sealing of the spout with the closure cap, especially when subjected to loads other than in the vertical direction and especially when the bottle is dropped. Such a closure is unsuitable for transporting and storing hazardous liquids. This disadvantage is to be avoided according to the suggested solution by extending the venting channel to the end of the bottle neck and not to the upper end of the spout. Thus, the spout can be provided with a continuous lip and its thread is not interrupted. However, this has the disadvantage that in the initial stages of emptying the container, i.e., in the critical phase of emptying, the contained liquid can enter the venting channel and close it off so that gurgling and splashing cannot be avoided.

It is therefore an object of the present invention to provide an arrangement for a venting channel with which over the entire pouring process from its beginning to its end an uninterrupted, directed and uniform as well as continuous outflow is ensured and any gurgling due to sucking in air can be prevented.

SUMMARY OF THE INVENTION

A container produced of plastic material by blow-molding in a blow-molding device according to the present invention is primarily characterized by:

an upper wall and a bottom connected to one another by a sidewall;

a filling/pouring spout located at the sidewall, the filling/pouring spout having an outer thread and a continuous circular sealing surface;

a venting channel for providing a uniform, continuous outflow of a liquid contained in the container, the venting channel separated by a stay from the upper wall of the container, the stay produced by squeezing edges of the blow-molding device;

the venting channel having an inlet located within the filling/pouring spout, wherein an upper end of the inlet is positioned at a level of an uppermost thread winding of the outer thread, which uppermost thread winding is continuous;

the venting channel extending substantially horizontally above the upper wall in the form of a closed conduit from the inlet toward a portion of the sidewall opposite the filling/pouring spout into a vacuum space of the container in which, upon pouring of the liquid, a vacuum is created when no pressure compensation is provided;

the venting channel having an underside extending downwardly at an angle of 2° to 15° relative to the horizontal; and wherein thread windings of the outer thread below the uppermost thread winding have discontinuities resulting from the squeezing edges of the blow-molding device for forming the stay, wherein portions of the thread windings extend across a backside of the inlet of the venting channel between the discontinuities.

Preferably, the container is in the form of a parallelepiped, wherein the sidewall is comprised of four sidewall sections positioned substantially at right angles to one another and connected to the upper wall and the bottom so as to have rounded corners and edges. The filling/pouring spout is positioned at one of the sidewall sections.

In another embodiment, the sidewall is cylindrical and has a rounded transition into the upper wall and the bottom.

Preferably, the cylindrical sidewall has a round cross-section or an oval cross-section.

The container is stackable without stacking aids, i.e., the containers can be stacked on one another without having to provide lateral or horizontal supporting means (shelves, securing bands etc.).

In a preferred embodiment of the present invention, the outlet opening of the venting channel is always positioned above a liquid level within the container during pouring.

The angle relative to the horizontal is preferably 5°.

The venting channel is advantageously produced with an auxiliary blowing finger of the blow-molding device.

The present invention also relates to a device for manufacturing a container produced of plastic material by blow-molding. The inventive device is primarily characterized by:

a blow mold for blow molding the container;

the blow mold having symmetrical lateral mold parts;

each the lateral mold part having a squeezing edge for forming a squeezing zone together with the squeezing edge of the other mold part; and the squeezing zone separating a first molding nest for the venting channel from a second molding nest for the interior of the container and the filling/pouring spout.

Expediently, the squeezing edges have a bend and the blow mold has a thread molding area for the outer thread. The squeezing edges extend preferably into the thread molding area to the location of the uppermost thread winding resulting in discontinuities in the thread molding area.

The squeezing edges at their end remote from the filling/pouring spout have a recess between the walls of the blow mold for forming an outlet opening of the venting channel.

In a preferred embodiment of the present invention, the blow mold further comprises a blowing and calibrating finger with an auxiliary blowing and calibrating finger for forming the inlet of the venting channel. The auxiliary blowing and calibrating finger may be stationary or moveable in its axial direction.

An important feature of the present invention is that the venting channel, when the container is in a vertical position, is closed over its length from its inlet to its end (outlet opening) within the vacuum space of the container and extends at a downward slant from the inlet to the outlet opening so that liquid which has entered the venting channel during transport due to sloshing of the liquid within the container can immediately exit the venting channel through the outlet opening. Furthermore, the venting channel extends to the rearward sidewall so that its outlet opening, already at the beginning of the pouring action, is positioned above the liquid level in the container. It is especially important that its inlet positioned within the filling/pouring spout extends as far as possible to the top of the spout in order to keep the stream of air entering the container separate from the outflowing liquid and in order to divert the liquid flow from the upper end (opening) of the inlet of the venting channel.

With the inventive container it is for the first time possible to provide for a reliable, uniform and directed pouring action.

BRIEF DESCRIPTION OF THE DRAWINGS

The object and advantages of the present invention will appear more clearly from the following specification in conjunction with the accompanying drawings, in which:

FIG. 7 shows an upper lateral portion of a mold part of a two-part blow mold for manufacturing the container of FIGS. 1 through 6 in a top plan view of the vertical partition plane whereby the hatched surfaces represent engagement surfaces of the squeezing edges;

FIG. 8 shows a vertical section of the blowing and calibrating finger of the blow mold of FIG. 7; and FIG. 9 shows a plan view of the blowing and calibrating finger of FIG. 8 viewed in the direction of arrow IX in FIG. 8.

DESCRIPTION OF PREFERRED EMBODIMENTS

The present invention will now be explained in detail with the aid of several specific embodiments utilizing FIGS. 1 through 9.

Figure 1:
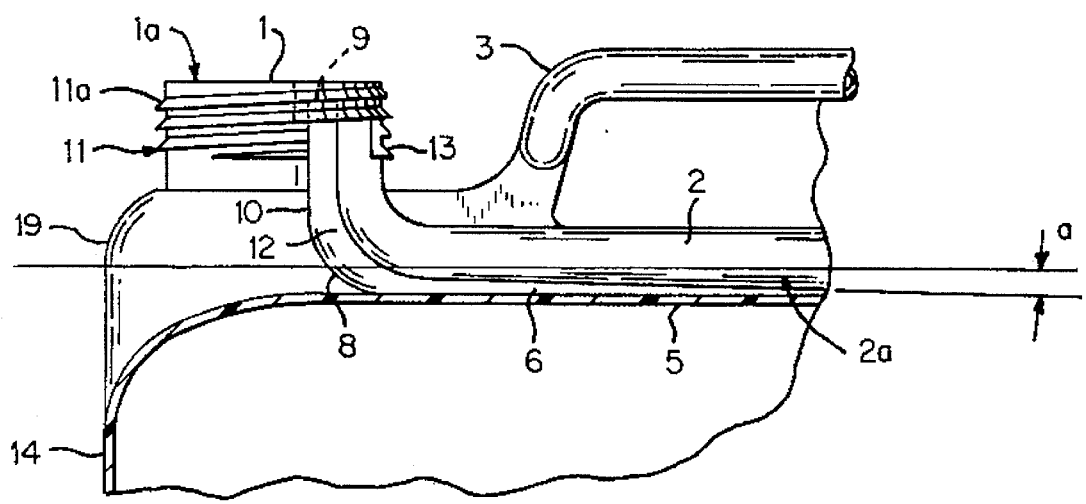
FIG. 1 shows a part-sectional view of the inventive container in the plane I—I of FIG. 2 with a side elevational view of the filling/pouring spout.
Figure 3:
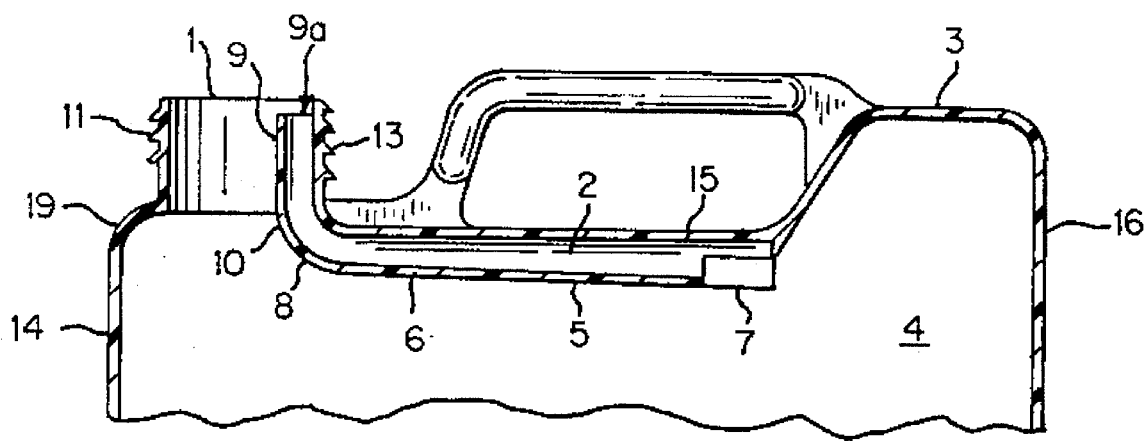
FIG. 3 shows a part-sectional view of the same container in the plane III—III of FIG. 2.

The inventive stackable container, represented in FIG. 1 in a part-sectional and part-elevational view and in FIG. 3 in part-sectional view, has a filling/pouring spout 1 with a circular sealing surface 1a and a venting channel 2 which extends from the interior of the filling/pouring spout 1 to the rearward stacking shoulder 3. Through the venting channel 2 air can be sucked from the exterior during emptying of the container into the vacuum space 4 below the stacking shoulder 3 in which a vacuum is formed during emptying of the container. The venting channel 2 is connected to the filling/pouring spout 1 and the upper wall 5 of the container with a stay 6 made of the container material. This stay 6 is formed by the squeezing edges 17 of the blow mold (FIGS. 3 and 7) and ends at its rearward portion at an outlet opening 7 (FIGS. 3 and 6) penetrating the upper wall 5 of the container. The venting channel 2 is represented in detail in FIGS. 4, 5 and 6 in a cross-sectional view. The venting channel 2 has a bend 8 and extends from there upwardly into the interior of the filling/pouring spout 1 and has an upwardly open inlet 9. The upwardly extending inlet 9 separates the venting channel 2 from the interior of the spout 1 so that during pouring the stream of liquid is clearly separated and deflected from the venting channel 2 thereby preventing liquid from entering and blocking the channel 2. The stay 6 thus is bent correspondingly upwardly in order to connect the venting channel 2 to the recessed and flattened inner wall segment 10 of the filling/pouring spout 1 that delimits the inlet 9 of the venting channel 2. The upper end 9a of the inlet 9 of the venting channel 2 is positioned at the level of the uppermost, continuous thread winding 11a of the outer thread 11 of the filling/pouring spout 1. The lower thread windings have gaps (discontinuities) at 12 caused by the squeezing edges 17 of the blow mold which form the stay 6. However, the exterior side of the inlet 9 of the venting channel 2 is provided with thread windings at 13 in order to securely connect the closure cap of the container to the spout 1.

Figure 4:
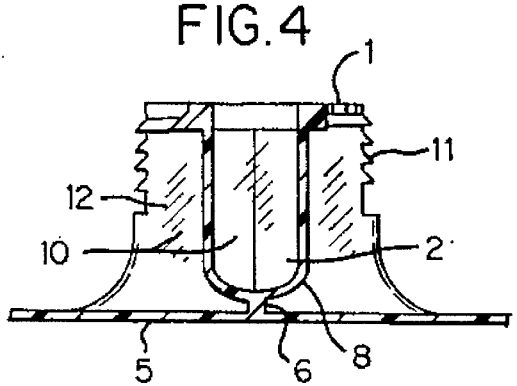
FIG. 4 shows a vertical part-sectional view of the container of FIG. 1 in the plane IV—IV of FIG. 2.
Figure 5:
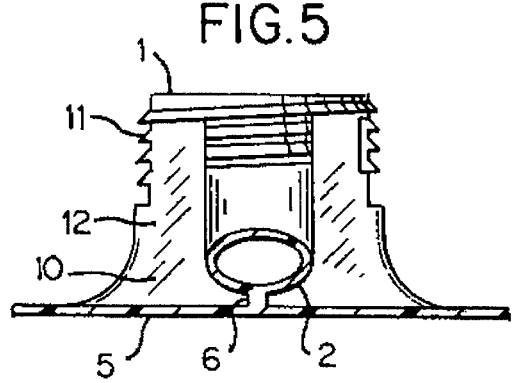
FIG. 5 shows a vertical part-sectional view of the same container in the plane V—V of FIG. 2.
Figure 6:
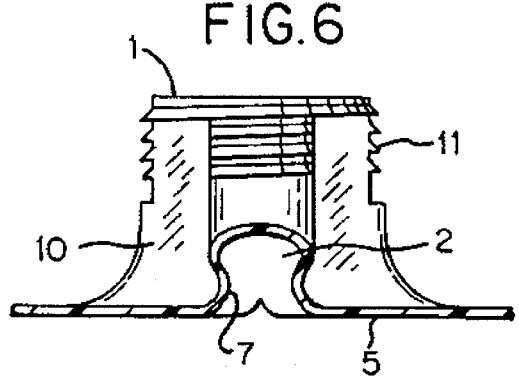
FIG. 6 shows a vertical part-sectional view of the same container in the plane VI—VI in FIG. 2.
Figure 2:
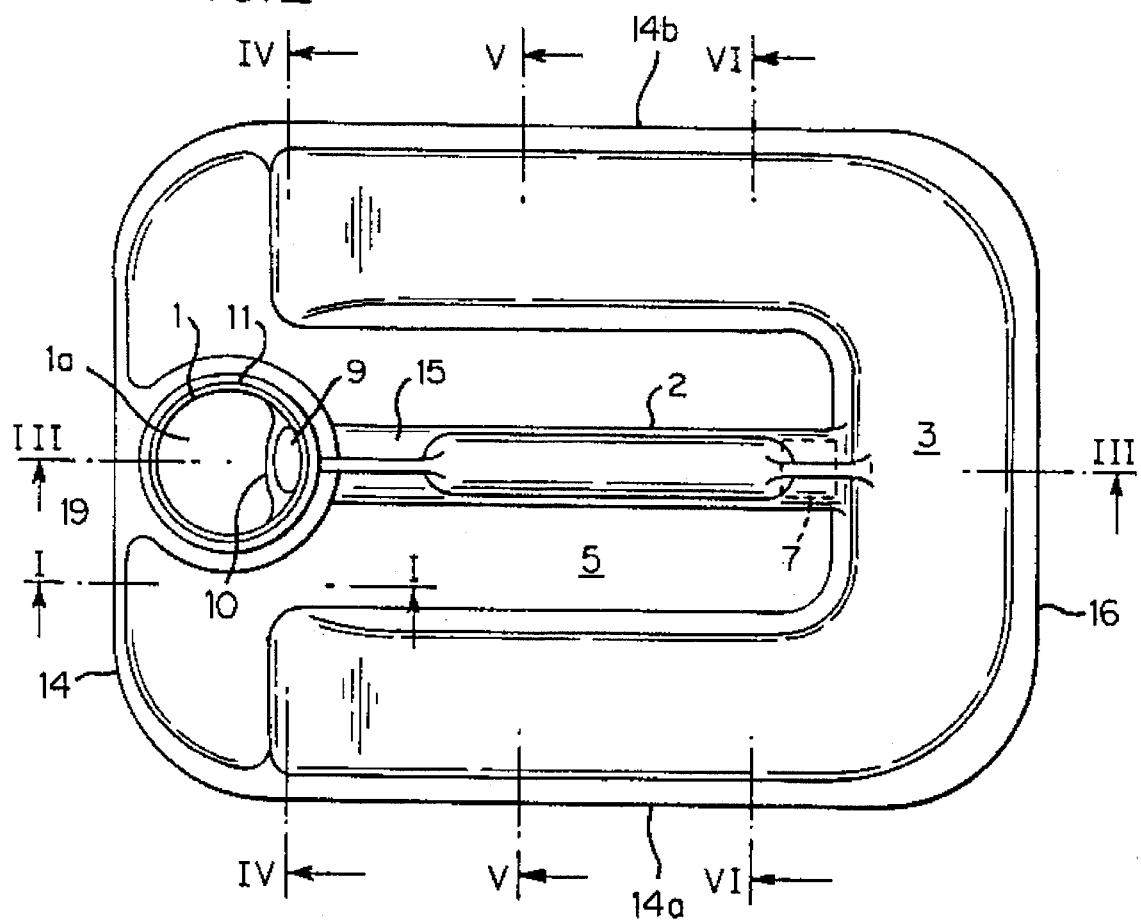
FIG. 2 shows a plan view of the container of FIG. 1 from the top.

In the direction toward its outlet opening 7 the underside 2a of the venting channel 2 is slanted downwardly at a small angle α of approximately 2° to 15° and preferably 5° so that liquid contained in the container which has entered the venting channel 2 during transport can flow back into the interior of the container when in its rest position. Thus, it is ensured that the venting channel 2 when emptying the container is completely free of liquid. Along its extension, venting channel 2 can have a substantially elliptical cross-section as shown in FIG. 5. FIG. 4 shows a section of the bend 8 and the filling/pouring spout 1; FIG. 6 shows a section of the outlet opening 7. In FIG. 2, showing a parallelepipedal container with sidewall sections (front wall 14, sidewalls 14a and 14b, and rear wall 16), the outlet opening 7 is indicated as a dashed line. The inventive container may also be cylindrical (not shown).

FIG. 7 shows the upper portion of the lateral mold part A of the two-part blow mold for producing the inventive container. The figure shows a plan view of the plane of partition with cutting edges that generate the exterior seam of the container. These edges extend from the front wall 14 of the container to the filling/pouring spout 1, from there via the upper side 15 of the venting channel 2 to the stacking shoulder 3 and to the backwall 16 of the container. The underside of the venting channel 2 is formed by a squeezing edge 17 that extends from the stacking shoulder 3 via the bend 8 to the filling/pouring spout 1. When the blow mold is closed, the squeezing edge 17 forms with its counter part of the second mold part the stay 6, the inner segment wall 10 of the filling/pouring spout 1, and the discontinuities (gaps in the thread windings as a continuation of 6) between the wall segment 10 and the vertically extending inlet 9 of the venting channel 2. At its rearward end the squeezing edge 17 is recessed from the plane of partition of the mold for forming the outlet opening 7 of the venting channel 2 at 18. Accordingly, the edge 17 does not squeeze the preformed container at this location so that the outlet opening 7 remains open as shown in FIG. 7.

During blow-molding of the container the squeezing edge 17, as can be seen in FIGS. 1 and 4, penetrates deeply at 12 between the neck 19 of the filling/pouring spout 1 and the bend 8 of the venting channel 2.

For blowing the container a primary blowing and calibrating finger 20 is provided which is shown in FIGS. 8 and 9 and which is secured against rotation. The blowing and calibrating finger 20 is provided with a blow channel 21 and a return channel 22 surrounding the blow channel 21. The blowing and calibrating finger 20 further comprises a preferably extendable rigid auxiliary calibrating and blowing finger 23 for blowing the venting channel 2. The auxiliary finger 23, if extendable, can be introduced into the portion of the spout area where the venting channel 2 is to be formed after insertion of the primary blowing and calibrating finger 20 for forming the interior 1a of the spout. (The inlet 9 of the venting channel 2 has not been formed or has not been formed completely when the blow mold is closed.) The auxiliary finger 23 then forms the inlet 9 of the venting channel 2 and blows open the venting channel 2 over its entire length. The auxiliary finger 23, like the blowing and calibrating finger 20, comprises a blow channel 24 and a return channel 25.

The auxiliary finger 23 may be stationary instead of extendable (telescoping). In this case it projects farther so that the inlet 9 of the venting channel 2 is widened and blown simultaneously with the insertion of the blowing and calibrating finger 20 into the filling/pouring spout 1.

The present invention is, of course, in no way restricted to the specific disclosure of the specification and drawings, but also encompasses any modifications within the scope of the appended claims.

What I claim is:

1. A container produced of plastic material by blow-molding in a blow-molding device, said container comprising:

an upper wall and a bottom connected to one another by a sidewall;

a filling/pouring spout located at said sidewall, said filling/pouring spout having an outer thread with at least three thread windings and a continuous circular sealing surface;

a venting channel for providing a uniform, continuous outflow of a liquid contained in said container, said venting channel separated by a stay from said upper wall of said container, said stay produced by squeezing edges of the blow-molding device;

said venting channel having an inlet located within said filling/pouring spout, wherein an upper end of said inlet is positioned at a level of an uppermost thread winding of said outer thread, which uppermost thread winding is continuous;

said venting channel extending substantially horizontally above said upper wall in the form of a closed conduit from said inlet toward a portion of said sidewall opposite said filling/pouring spout into a vacuum space of said container in which, upon pouring of the liquid, a vacuum is created when no pressure compensation is provided;

said venting channel having an underside extending downwardly at an angle of 2° to 15° relative to the horizontal; and wherein said thread windings of said outer thread below said uppermost thread winding have discontinuities resulting from the squeezing edges of the blow-molding device for forming said stay, wherein portions of said thread windings extend across a backside of said inlet of said venting channel between said discontinuities.

2. A container according to claim 1, in the form of a parallelepiped, wherein said sidewall is comprised of four sidewall sections positioned substantially at right angles to one another and connected to said upper wall and said bottom so as to have rounded corners and edges, wherein said filling/pouring spout is positioned at one of said sidewall sections.

3. A container according to claim 1, having a stacking shoulder for stacking thereon another container.

4. A container according to claim 1, wherein an outlet opening of said venting channel is always positioned above a liquid level within said container during pouring.

5. A container according to claim 1, wherein said angle relative to the horizontal is 5°.

6. A container according to claim 1, wherein said venting channel is produced with an auxiliary blowing finger of the blow-molding device.

* * * * *